US009627729B2

(12) United States Patent
Meyers et al.

(10) Patent No.: US 9,627,729 B2
(45) Date of Patent: Apr. 18, 2017

(54) POWER SYSTEM FOR A TELECOMMUNICATIONS NETWORK

(71) Applicant: SPRINT COMMUNICATIONS COMPANY L.P., Overland Park, KS (US)

(72) Inventors: Jerry Meyers, Overland Park, KS (US); Larry L. Johnson, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 14/857,393

(22) Filed: Sep. 17, 2015

(65) Prior Publication Data

US 2016/0028136 A1    Jan. 28, 2016

Related U.S. Application Data

(62) Division of application No. 11/567,436, filed on Dec. 6, 2006, now Pat. No. 9,142,844.

(51) Int. Cl.
*H01M 16/00* (2006.01)
*H01M 8/04089* (2016.01)
(Continued)

(52) U.S. Cl.
CPC ..... *H01M 16/003* (2013.01); *H01M 8/04089* (2013.01); *H01M 8/04208* (2013.01);
(Continued)

(58) Field of Classification Search
None
See application file for complete search history.

(56) References Cited

U.S. PATENT DOCUMENTS 4,119,861 A    10/1978    Gocho
4,161,657 A    7/1979    Shaffer, Jr.
(Continued)

FOREIGN PATENT DOCUMENTS

EP    0595191 A1    5/1994
EP    0718094 A2    6/1996
(Continued)

OTHER PUBLICATIONS

"A High-Availability Backup Source of Energy", J.C. Chigolet et al. Sep. 27, 1993.
(Continued)

*Primary Examiner* — Alix Eggerding

(57) ABSTRACT

A reliable, end-to-end power supply solution for components of a telecommunications network provides either a primary source or a backup source of electrical power at various telecommunications sites for reliable operation of telecommunications equipment. One subsystem of the power supply solution includes one or more proton exchange membrane type fuel cells and an energy storage device for storing DC electrical power produced by the fuel cells. Another subsystem includes one or more microturbine generators, one or more rectifiers for converting AC electrical power produced by the microturbine generators to DC electrical power, and one or more proton exchange membrane type fuel cells for producing DC electrical power. The power supply solution ensures that voice and data traffic is reliably handled by a telecommunications network in situations where commercial electric utilities fail to supply power at certain points along the network.

10 Claims, 6 Drawing Sheets

(51) Int. Cl.
*H01M 8/04082* (2016.01)
*H01M 8/04858* (2016.01)
*H01M 8/04828* (2016.01)
*H01M 8/0612* (2016.01)
*H01M 8/249* (2016.01)
*H01M 8/0438* (2016.01)
*H01M 8/04746* (2016.01)
*H01M 8/04992* (2016.01)
*H01M 8/0606* (2016.01)
*H01M 8/1018* (2016.01)

(52) U.S. Cl.
CPC ... *H01M 8/04425* (2013.01); *H01M 8/04753* (2013.01); *H01M 8/04917* (2013.01); *H01M 8/04947* (2013.01); *H01M 8/0612* (2013.01); *H01M 8/249* (2013.01); *H01M 8/04388* (2013.01); *H01M 8/04746* (2013.01); *H01M 8/04992* (2013.01); *H01M 8/0606* (2013.01); *H01M 2008/1095* (2013.01); *H01M 2250/10* (2013.01); *H01M 2250/402* (2013.01); *Y02B 90/12* (2013.01); *Y02B 90/14* (2013.01); *Y02E 60/50* (2013.01)

(56) References Cited

U.S. PATENT DOCUMENTS

| | | | |
|---|---|---|---|
| 4,283,634 A | 8/1981 | Yannone | |
| 4,598,542 A | 7/1986 | Reynolds | |
| 5,141,824 A | 8/1992 | Hirota | |
| 5,332,927 A | 7/1994 | Paul et al. | |
| 5,477,091 A | 12/1995 | Fiorina et al. | |
| 5,642,662 A | 7/1997 | Schwelling | |
| 5,737,202 A | 4/1998 | Shimamori | |
| 5,760,488 A | 6/1998 | Sonntag | |
| 5,767,584 A | 6/1998 | Gore et al. | |
| 5,767,637 A | 6/1998 | Lansberry | |
| 5,929,538 A | 7/1999 | O'Sullivan et al. | |
| 5,939,799 A | 8/1999 | Weinstein | |
| 5,994,795 A | 11/1999 | Gabillet | |
| 6,011,324 A | 1/2000 | Kohlstruck et al. | |
| 6,175,217 B1 | 1/2001 | Da Ponte et al. | |
| 6,184,593 B1 | 2/2001 | Jungreis | |
| 6,295,447 B1 | 9/2001 | Reichelt et al. | |
| 6,304,006 B1 | 10/2001 | Jungreis | |
| 6,380,637 B1 | 4/2002 | Hsu et al. | |
| 6,428,918 B1 | 8/2002 | Fuglevand et al. | |
| 6,452,289 B1 | 9/2002 | Lansberry et al. | |
| 6,463,738 B1 | 10/2002 | Pinkerton et al. | |
| 6,498,462 B2 | 12/2002 | Ballantine et al. | |
| 6,503,649 B1 | 1/2003 | Czajkowski et al. | |
| 6,516,616 B2 | 2/2003 | Carver et al. | |
| 6,522,955 B1 | 2/2003 | Colborn | |
| 6,541,940 B1 | 4/2003 | Jungreis | |
| 6,551,731 B1 | 4/2003 | Berg et al. | |
| 6,559,551 B2 | 5/2003 | Graage et al. | |
| 6,615,118 B2 | 9/2003 | Kumar | |
| 6,628,006 B2 | 9/2003 | Oglesby et al. | |
| 6,630,750 B2 | 10/2003 | McAndrews | |
| 6,649,289 B2 | 11/2003 | Hsu et al. | |
| 6,670,721 B2 | 12/2003 | Lof et al. | |
| 6,700,214 B2 | 3/2004 | Ulinski et al. | |
| 6,703,722 B2 | 3/2004 | Christensen | |
| 6,833,631 B2 | 12/2004 | Van Breems | |
| 6,841,893 B2 | 1/2005 | Maiwald | |
| 6,879,052 B1 | 4/2005 | Johnson | |
| 6,885,112 B2 | 4/2005 | Johnson | |
| 6,902,837 B2 | 6/2005 | McCluskey et al. | |
| 6,930,402 B1 | 8/2005 | Johnson et al. | |
| 6,960,838 B2 | 11/2005 | Johnson | |
| 6,992,401 B1 | 1/2006 | Johnson | |
| 7,000,395 B2 | 2/2006 | Wai et al. | |
| 7,081,687 B2 | 7/2006 | Johnson | |
| 7,098,548 B2 | 8/2006 | Johnson | |
| 7,112,891 B2 | 9/2006 | Johnson et al. | |
| 7,127,895 B2 | 10/2006 | Pinkerton et al. | |
| 7,261,962 B1* | 8/2007 | Czajkowski | H01M 8/04947 429/423 |
| 7,298,053 B2 | 11/2007 | Johnson et al. | |
| 7,370,666 B2 | 5/2008 | Willets et al. | |
| 2001/0009338 A1 | 7/2001 | Reutere | |
| 2003/0112965 A1 | 6/2003 | McNamara | |
| 2003/0113601 A1* | 6/2003 | Edlund | H01M 8/04089 429/425 |
| 2003/0124398 A1 | 7/2003 | Rabinovich et al. | |
| 2003/0190030 A1* | 10/2003 | Alton | H04W 76/068 379/219 |
| 2004/0094963 A1 | 5/2004 | Johnson | |
| 2004/0095022 A1 | 5/2004 | Johnson | |
| 2004/0126635 A1* | 7/2004 | Pearson | H01M 8/04089 429/430 |
| 2004/0131901 A1 | 7/2004 | Yamashita et al. | |
| 2005/0026021 A1 | 2/2005 | Hasegawa et al. | |
| 2005/0120737 A1 | 6/2005 | Borror et al. | |
| 2005/0249989 A1* | 11/2005 | Pearson | H01M 8/0491 429/431 |
| 2006/0016189 A1 | 1/2006 | Johnson | |
| 2006/0038403 A1 | 2/2006 | Johnson | |
| 2006/0038533 A1 | 2/2006 | Johnson et al. | |
| 2006/0049637 A1 | 3/2006 | Johnson | |
| 2006/0066105 A1 | 3/2006 | Johnson et al. | |
| 2006/0071476 A1 | 4/2006 | Johnson | |
| 2006/0076780 A1 | 4/2006 | Johnson | |
| 2006/0246177 A1* | 11/2006 | Miki | F17C 5/007 426/24 |
| 2007/0059583 A1 | 3/2007 | Vinsant | |
| 2008/0093929 A1 | 4/2008 | Meyers et al. | |
| 2008/0115496 A1 | 5/2008 | Willets et al. | |
| 2008/0115505 A1 | 5/2008 | Willets et al. | |
| 2014/0065499 A1* | 3/2014 | McElroy | H01M 8/0662 429/415 |

FOREIGN PATENT DOCUMENTS

| | | |
|---|---|---|
| WO | 9932762 A1 | 7/1999 |
| WO | 2004047206 A2 | 6/2004 |
| WO | 2004105212 A1 | 12/2004 |

OTHER PUBLICATIONS

Noboru Asano, "The Future of Our Fuel Cell Total Energy System," NTT Review, Mar. 1994, vol. 6, pp. 47-53.
Yutaka, Kuwata, "Multifueld Fuel-Cell Energy System for Telecommunications Cogeneration System," Iece Trans Commun., vol. E1 B., No. 11, Nov. 1998.
Non-Final Office Action dated Jun. 28, 2007 in U.S. Appl. No. 11/132,013, 7 pages.
Final Office Action dated Dec. 13, 2007 in U.S. Appl. No. 11/132,013, 7 pages.
Non-Final Office Action dated Jun. 23, 2008 in U.S. Appl. No. 11/132,013, 7 pages.
Final Office Action dated Dec. 16, 2008 in U.S. Appl. No. 11/132,013, 14 pages.
Non-Final Office Action dated Jun. 15, 2009 in U.S. Appl. No. 11/132,013, 18 pages.
Final Office Action dated Jan. 20, 2010 in U.S. Appl. No. 11/132,013, 16 pages.
Notice of Allowance dated Jun. 20, 2008 in U.S. Appl. No. 11/567,451, 11 pages.
Supplementary European Search Report Application No. EP 07869002, mailed Jan. 2, 2014, 10 pages.
Tohru Koyashiki et al: "Advanced Fuel Cell Energy System for Telecommunications Use", Proceedings of the International Telecommunications Energy Conference, (INTELEC). Washington, Oct. 4-8, 1992; [proceedings of the International Telecommunications Energy Conference, (INTELEC)], New York, IEEE, US, vol. Conf. 14, Oct. 4, 1992 (Oct. 4, 1992) pp. 4-11, XP000357507, p. 4-p. 11.

(56) References Cited

OTHER PUBLICATIONS

Non-Final Office Action dated Dec. 6, 2010 in U.S. Appl. No. 11/567,436, 10 pages.
Final Office Action dated May 12, 2011 in U.S. Appl. No. 11/567,436, 7 pages.
Non-Final Office Action dated Feb. 22, 2013 in U.S. Appl. No. 11/567,436, 10 pages.
Final Office Action dated Jun. 9, 2013 in U.S. Appl. No. 11/567,436, 12 pages.
Non-Final Office Action dated Feb. 12, 2014 in U.S. Appl. No. 11/567,436, 12 pages.
Final Office Action dated May 28, 2014 in U.S. Appl. No. 11/567,436, 12 pages.
Non-Final Office Action dated Sep. 4, 2014 in U.S. Appl. No. 11/567,436, 10 pages.
Final Office Action dated Feb. 11, 2015 in U.S. Appl. No. 11/567,436, 10 pages.
Notice of Allowance dated May 15, 2015 in U.S. Appl. No. 11/567,436, 5 pages.
Non-Final Office Action dated Jun. 30, 2011 in U.S. Appl. No. 12/180,961, 8 pages.
Final Office Action dated Jan. 24, 2012 in U.S. Appl. No. 12/180,961, 8 pages.
Non-Final Office Action dated Jul. 25, 2013 in U.S. Appl. No. 12/180,961, 8 pages.
Final Office Action dated Jan. 24, 2014 in U.S. Appl. No. 12/180,961, 12 pages.
Canadian Office Action dated Aug. 15, 2016 in Canadian Patent Application No. 290726, 3 pages.

\* cited by examiner

POWER SYSTEM FOR A TELECOMMUNICATIONS NETWORK

CROSS-REFERENCE TO RELATED APPLICATIONS

This application is a divisional application of and claims priority to U.S. application Ser. No. 11/567,436, filed Dec. 6, 2006, and entitled "POWER SYSTEM FOR A TELECOMMUNICATIONS NETWORK," which is in turn a continuation-in-part of U.S. application Ser. No. 11/132,013, filed May 18, 2005, and entitled "POWER SYSTEM WITH REFORMER," the teachings of which are incorporated herein by reference.

STATEMENT REGARDING FEDERALLY SPONSORED RESEARCH OR DEVELOPMENT

Not applicable.

BACKGROUND

Telecommunications service providers are increasingly concerned about maintaining reliable network connections for both voice and data transmissions. One particular area of concern is the maintenance of an adequate power supply at various sites along a telecommunications network in order to ensure telecommunication equipment and facilities housing such equipment are functioning properly. For instance, at a remotely located telecommunications facility, such as a wireless communication site (a "cell site") utilizing a base transceiver system (station), the loss of power from a commercial electric utility typically results in a "dead area" where no wireless communications are supported by the particular cell site. Even more critical is the maintenance of reliable and adequate power at a telecommunications exchange (switching office or subsystem) or a point of presence server, since power loss would result in the disabling of one or more telephone switches or critical gateways to the Internet, thereby affecting large volumes of voice and/or data traffic.

Backup power supply for telecommunications network sites has traditionally been supplied through diesel generators and the like, or lead-acid batteries. There are many disadvantages, however, to each solution. Among other things, diesel generators often emit large amounts of pollution during operation, and are also prone to mechanical breakdown. Furthermore, such generators and the accompanying fuel storage device for supplying fuel take up significant amount of space per unit of power produced, making such devices unsuitable for use at telecommunications sites where space is critical. Lead-acid batteries also require significant maintenance over time, and may post a health and environmental hazard due to the corrosive gases produced by the batteries. Another drawback of lead-acid batteries is that such batteries suffer from a declining ability over time to hold a maximum amount of energy, which results in the useful lifespan of such batteries oftentimes being shorter than a rated lifespan for the batteries.

SUMMARY OF THE INVENTION

A reliable, end-to-end power supply solution for a telecommunications network is provided. In embodiments, the power supply solution serves as either a primary source or a backup source of electrical power at various sites, providing levels of redundancy to ensure electrical power delivery to telecommunications equipment.

In one aspect, a power system of the present invention includes first and second subsystems for providing DC electrical power. For instance, the first subsystem provides power to a wireless communication site utilizing a base transceiver system, while the second subsystem provides power to a telecommunications exchange (switching office or subsystem) or to a point of presence server. The first subsystem includes one or more proton exchange membrane type fuel cells and an energy storage device for storing DC electrical power produced by the fuel cells. The second subsystem includes one or more microturbine generators, one or more rectifiers for converting AC electrical power produced by the microturbine generators to DC electrical power, and one or more proton exchange membrane type fuel cells for producing DC electrical power.

In another aspect, the power system of the present invention further includes a third subsystem for providing DC electrical power, for instance, to a multiple systems operator in a telecommunications network. The third subsystem includes one or more proton exchange membrane type fuel cells for producing DC electrical power and a rectifier for converting incoming AC electrical power to DC electrical power. For instance, the incoming AC electrical power may be supplied by a commercial electric utility.

Through the power system of the present invention, voice and data traffic able to be carried along a telecommunications network from a source to a destination (e.g., end user to end user) in situations where commercial electric utilities fail to supply power at certain points along the network.

Additional advantages and features of the invention will be set forth in part in a description which follows, and in part will become apparent to those skilled in the art upon examination of the following, or may be learned by practice of the invention.

BRIEF DESCRIPTION OF THE SEVERAL VIEWS OF THE DRAWING

The present invention is described in detail below with reference to the attached drawing figures, wherein.

DETAILED DESCRIPTION

Figure 1:
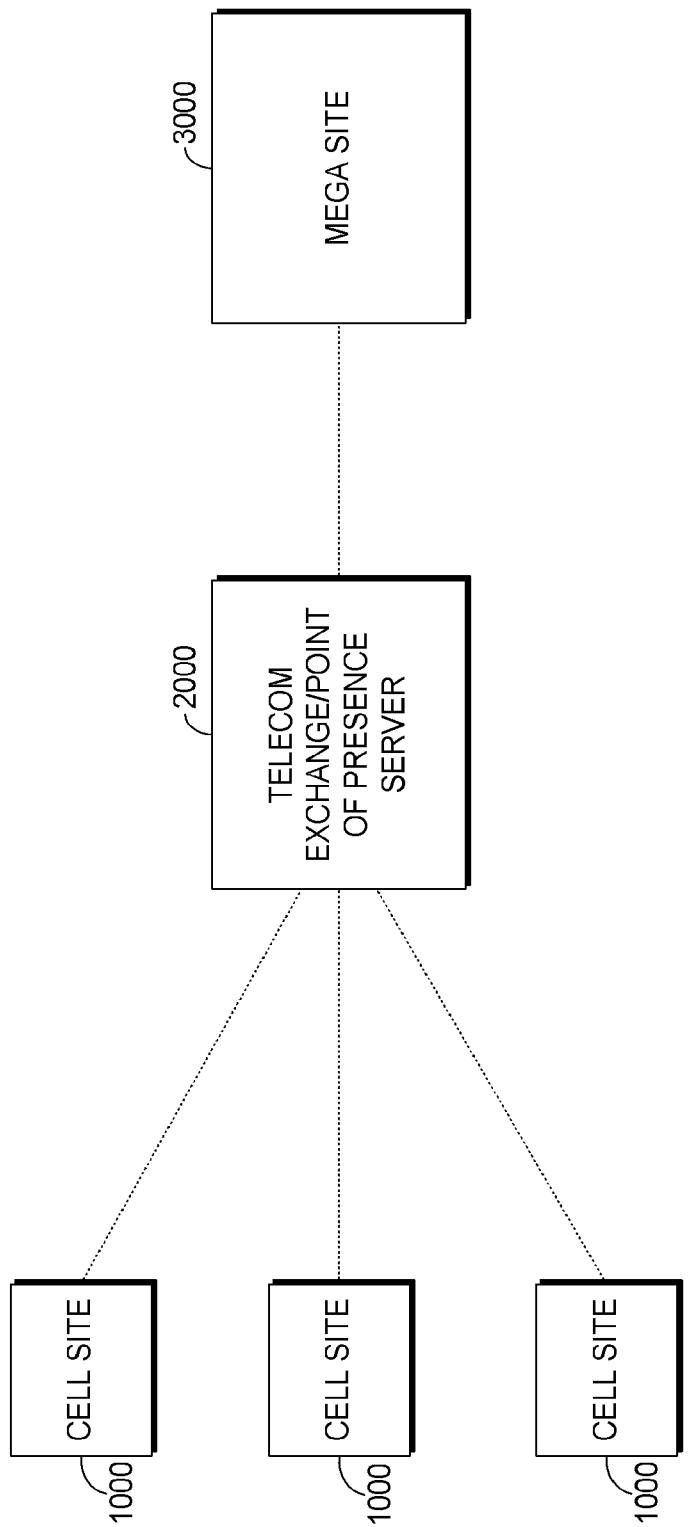
FIG. 1 is block diagram illustrating the general relationship between various portions of a telecommunications network.

Embodiments of the present invention relate to power system for a telecommunications network. One exemplary diagram of a simplified set of sites or facilities that handle voice and/or data traffic along a telecommunications network is provided in FIG. 1. A plurality of cell site facilities 1000, or wireless communication facilities that each have a base transceiver system, or BTS, (also referred to herein as a base station transceiver subsystem), are linked to a central facility 2000 serving as a telecommunications exchange (also referred to herein as a switching office or a network switching subsystem) or a point of presence (POP) server. The cell site facilities 1000 combine to provide wireless communication coverage areas for mobile device users engaging in voice or data communications. The central facility 2000, as one example, carries out switching functions and manages communications activity between the mobile device users serviced by the cell sites 1000 and the public switched telephone network, or PSTN. Additionally, the central facility 2000 may act as a POP server, to control access to the Internet by devices users serviced by the cell sites 1000, and may contain equipment for converting data signals to the proper protocol for such communications (e.g., TCP/IP). One or more central facilities 2000 may also be connected along a telecommunications network to a multiple systems operator, or mega site 3000. One example of a mega site 3000 is a facility that houses multiple telephone network switches and other equipment for managing telecommunications network traffic.

One conventional standard for powering individual phone lines in an analog telephone system is to provide 48 VDC to each line. This 48 VDC standard remains largely in place for telecommunications networks that interface with wired customer lines, despite the fact that digital transmission technology is utilized in the network. Accordingly, certain types of telecommunications equipment, such as a BTS, are designed to run on a supply of 48-54 VDC, the amount above 48 VDC taking into account voltage drop. The power system of the present invention includes power generating and storage components for supplying 54 VDC. In certain embodiments, the power system provides multiple 54 VDC components on one circuit to provide redundancy should one component either fail or expend the fuel supply to the component, or to act as a "bridge" to supply adequate electrical current during a startup phase of another component.

Figure 2:
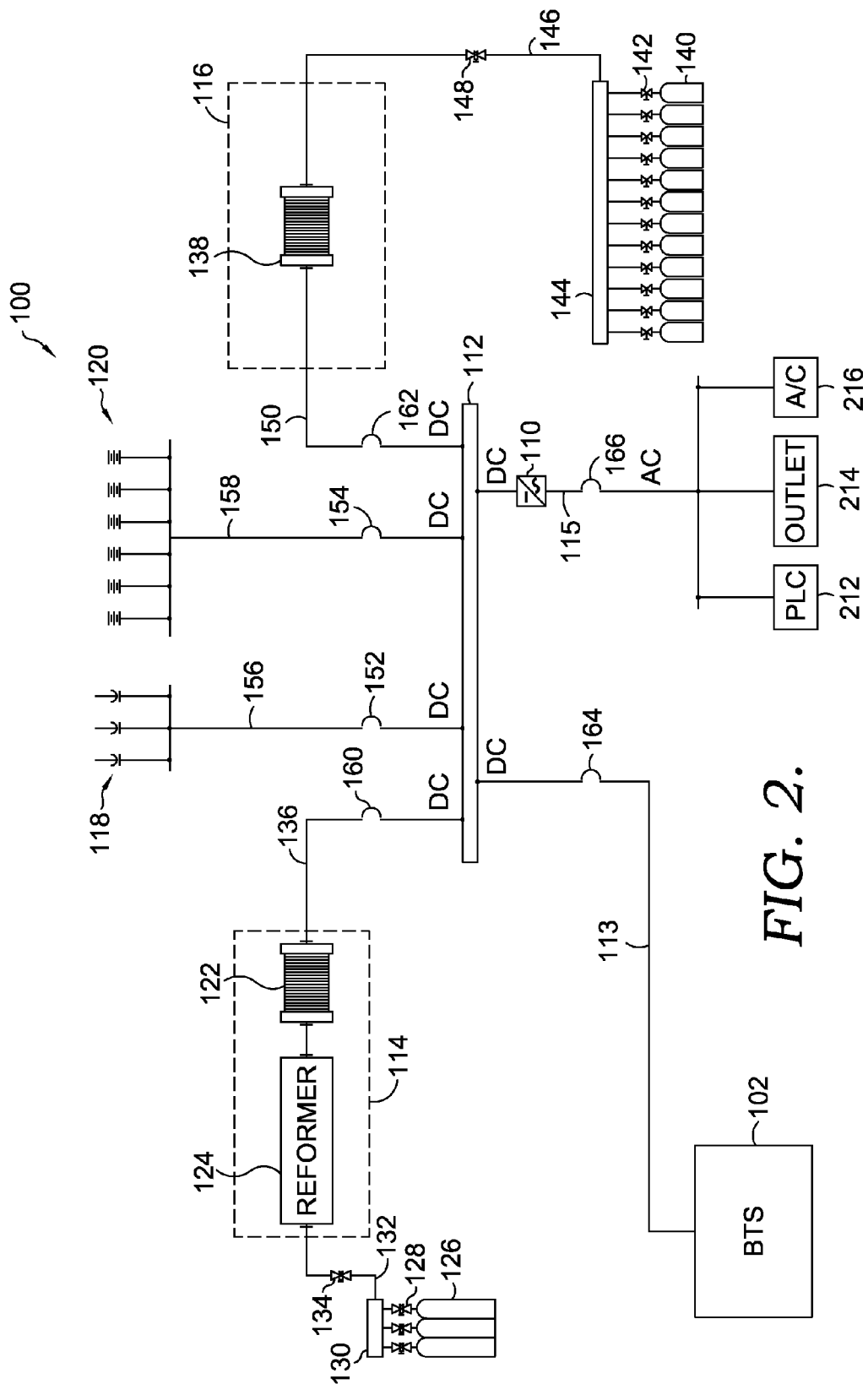
FIG. 2 is a schematic view of one embodiment of a first subsystem for providing DC electrical power at a telecommunications network site.

Turning to FIG. 2, a first subsystem 100 provides a power supply for a base transceiver system (BTS) 102 and other electronics at a wireless communication site 1000. For instance, the subsystem 100 may supply power for a control device in the form of a programmable logic controller (PLC) 104 or microprocessor that manages the switching between power supply components of the subsystem 100 during various modes of operation. Additionally, the subsystem 100 supplies power to a test power outlet 106 and to other facility devices, such as building air conditioning unit 108 for the cell site 100. The BTS 102 runs off of DC electrical power, while an inverter 110 is provided in the portion of the circuit supplying power to the PLC 104, the power outlet 106 and the air conditioning unit 108 to provide these devices with AC electrical power. In one suitable configuration, the inverter 110 takes 54 VDC at input and outputs 240 VAC. For handling the interconnection between the various power generating/supplying components (as explained in more detail herein) and the power consuming/delivering components, such as the BTS 102, the PLC 104, power outlet 106 and air conditioning unit 108, the first subsystem 100 employs a DC bus 112. For instance, a copper bus may be employed that can handle up to 300 amps. The DC bus 112 ensures that a minimum amount (and desirably a constant amount) of electrical power is readily available for the power consuming/delivering components electrically connected with the bus 112. The BTS 102 is electrically coupled with the DC bus 112 through a conductive line 113, while inverter 110 is located in-line on a conductive line 115 that electrically couples the PLC 104, power outlet 106 and air conditioning unit 108 with the DC bus 112.

The power generating/supplying components of the first subsystem 100 electrically coupled with the DC bus 112 include a primary power source component 114, a secondary power source component 116, a capacitive device 118 and a battery-type device 120. The primary power source component 114 includes one or more proton exchange membranes (PEM) 122 acting as fuel cells, as well as a hydrogen reformer 124 for supplying the PEM 122 with a supply of pressurized hydrogen gas. For instance, a set of high-pressure fuel storage tanks 126 contain liquid propane or natural gas and connect with the hydrogen reformer 124 through a supply line. The hydrogen reformer 124 converts the hydrocarbons in the fuel source (e.g., propane, natural gas) to essentially pure hydrogen gas needed by the PEM 122. The rate of hydrogen flow is controlled using automated pressure-controlled valves 128, with one valve heading each of the storage tanks 126. Each valve 128 enables the corresponding storage tank 126 to be sealed off (e.g., when a tank needs to be removed for maintenance or refueling). Downstream from the valves 128 is a common manifold 130 to more or less provide equal pressures in the storage tanks 126 with corresponding valves 128 in the open position. Extending downstream from the manifold 130 is a fuel line 132 or tubing that carries the fuel source to the hydrogen reformer 124. An in-line automated pressure-controlled valve 134 is included in the fuel line 132 to selectively allow and disallow fuel flow from the storage tanks 126 to the hydrogen reformer 124 depending on whether it is desired to have the primary component 114 in operation. The PEM 122, in one arrangement, produces a 54 VDC output carried by conductive line 136 to the DC bus 112.

In a similar arrangement, the secondary power source component 116 utilizes one or more proton exchange membranes 138 acting as fuel cells coupled with a fuel source. However, the PEM 138 of the secondary component 116 receives hydrogen fuel directly from a set of liquid hydrogen storage tanks 140, so no hydrogen reformer is needed. Connected with the storage tanks 140 are automated pressure-controlled valves 142 for each tank 140, as well as a common manifold 144 and a downstream fuel line 146 containing an in-line automated pressure-controlled valve 148. Because the PEM 138 operates with gaseous hydrogen, the fuel line 146 and the environment surrounding the line 146 is of a configuration as to cause the liquid hydrogen from the storage tanks 140 to absorb thermal energy and undergo a phase change to a gaseous state within the line 146. Additionally, there may be a pressure drop through the valves 142 to aid in the hydrogen phase change. Selective allowance and disallowance of fuel flow from the storage tanks 140 to the PEM 138 is controlled by the in-line automated valve 148 depending on whether it is desired to have the secondary component 116 in operation. As with the primary component 114, the PEM 138 produces, in one arrangement, a 54 VDC output carried by conductive line 150 to the DC bus 112.

The primary component 114 is designed to provide a DC power supply during a normal operating mode for the BTS 102 and other components, while the secondary component 116 provides power during a operating mode outside of the normal operating mode (e.g., a backup mode when the primary component 114 fails). Accordingly, the in-line automated valves 134 and 148, for instance, under the control of the PLC 104, are coordinated in their operation to be in the open position for when the respective component (primary 114 and/or secondary 116) is to be producing electrical current. However, it should be understood that the roles of the primary component 114 and the secondary component 116 may be reversed if desired. Alternatively, if a sufficient electrical current demand is placed on the first subsystem 100 by the power consuming/delivering components, the primary and secondary components 114 and 116 may operate simultaneously for a certain period of time to simultaneously supply electrical current to the DC bus 112. One exemplary 54 VDC proton exchange membrane suitable for use in the primary component 114 and the secondary component 116 is a modular, cartridge-based, proton exchange membrane I-1000 power module manufactured by Reli-On, Inc. of Spokane, Wash.

The capacitive device 118 preferably includes a plurality of capacitors and the battery-type device 120 preferably includes a plurality of lithium metal polymer batteries (LMPs). Both the capacitors 118 and the LMPs 120 may be charged by an independent electrical power source, or in one arrangement, through the DC bus 112 during operation of the primary component 114 or the secondary component 116. If the primary component 114 fails to provide adequate electrical current to the DC bus 112 or otherwise is switched off (e.g., to refill the storage tanks 126), the capacitors 118 and/or the LMPs 120 immediately provide adequate electrical current by discharging to the DC bus 112 to bridge the time period between the primary component 114 shut-off and secondary component 116 operation at steady state (i.e., during the secondary component 116 start-up phase). Breakers 152 and 154 may be placed in conductive lines 156 and 158 and under the control of the PLC 104 or other control device to selectively allow the capacitors 118 and the LMPs 120 to take up charge from or discharge to the DC bus 112 depending on the desired mode of operation. For instance, in one preferred embodiment, the capacitors 118 provide DC electrical current during the time it takes for the control device to open and close the in-line automated valves 134 and 148 and the fuel source to flow and generate sufficient electrical power with the respective primary or secondary components 114 or 116. Thus, ideally the capacitor arrangement has sufficient discharge time which is able to accommodate the longest of these possible delays. Another function of these capacitors is that they help smooth out the DC output of the PEMs 122 or 138 when more than one PEM is utilized in parallel with one another in the respective primary or secondary components 114 or 116 in operation. Commonly, the electrical output of whatever fuel cell is in use fluctuates. To make this DC output consistent, the capacitors fill in for any dips in electrical power providing a constant output level. One type of capacitor that is suitable for in the first subsystem 100 is a super capacitor manufactured by Maxwell Technologies of San Diego, Calif. The particular number of capacitors 118 selected for use in the first subsystem is dependant on the specific discharge and load requirements demanded by the power consuming components of the first subsystem 100. The LMPs 120 are primarily utilized as a backup power supply when both the primary component 114 and secondary component 116 fail to provide adequate electrical power to the DC bus 112. In this way, the LMPs 120 allow the first subsystem 100 operator additional time to refill the fuel in the fuel storage tanks 126 and/or the liquid hydrogen storage tanks 140 while maintaining adequate electrical current for operation of the wireless communication site 1000.

Exemplary modes of operation of the first subsystem 100, under the control of the PLC 104 or other control device, are now described. In a first sequence of activity, breaker 160 in conductive line 136 is closed, while breaker 162 in conductive line 150 remains open. At the same time, breakers 152 and 154 in conductive lines 156 and 158, respectively, remain open and breakers 164 and 166 in conductive lines 113 and 115 are closed to enable the BTS 102 as well as power consuming components on conductive lines 115 to received electrical current from the DC Bus 112. In-line automated valve 134 is moved to the open position (and storage tank valves 128 are likewise opened if not already opened) to enable the fuel source to flow to the reformer 124 and the PEM 122 of the primary component 114 to produce electrical power for supply through the conductive line 136 to the DC Bus 112. Upon a low pressure condition being sensed in the in-line valve 134 indicative of an insufficient fuel flow for continued operation of the primary component 114 at the desired power level, a second sequence of activity is engaged.

In the second sequence, breaker 160 is opened and breakers 152 and/or 154 are closed to supply electrical power from the capacitive device 118 and/or the battery-type device 120 to the DC Bus 112 for uninterrupted operation of the BTS 102 and other power consuming components. Additionally, in this second sequence, in-line automated valve 148 is moved to the open position (and storage tank valves 142 if not already opened) to enable the fuel source to flow to the PEM 138 of the secondary component 116 to effect electrical power production by the PEM 138 to supply through the conductive line 150 to the DC Bus 112.

The third sequence is initiated when the secondary component 116 moves from the start up phase to steady state operation in producing electrical power for supply to the DC Bus 112. In the third sequence, breaker 162 is closed and breakers 152 and/or 154 are opened. This is due to the fact that the secondary component 116 is meeting the electrical current needs at the DC Bus 112, and the electrical power supplied by the capacitive device 118 and battery-type device 120 is no longer needed.

Figure 3:
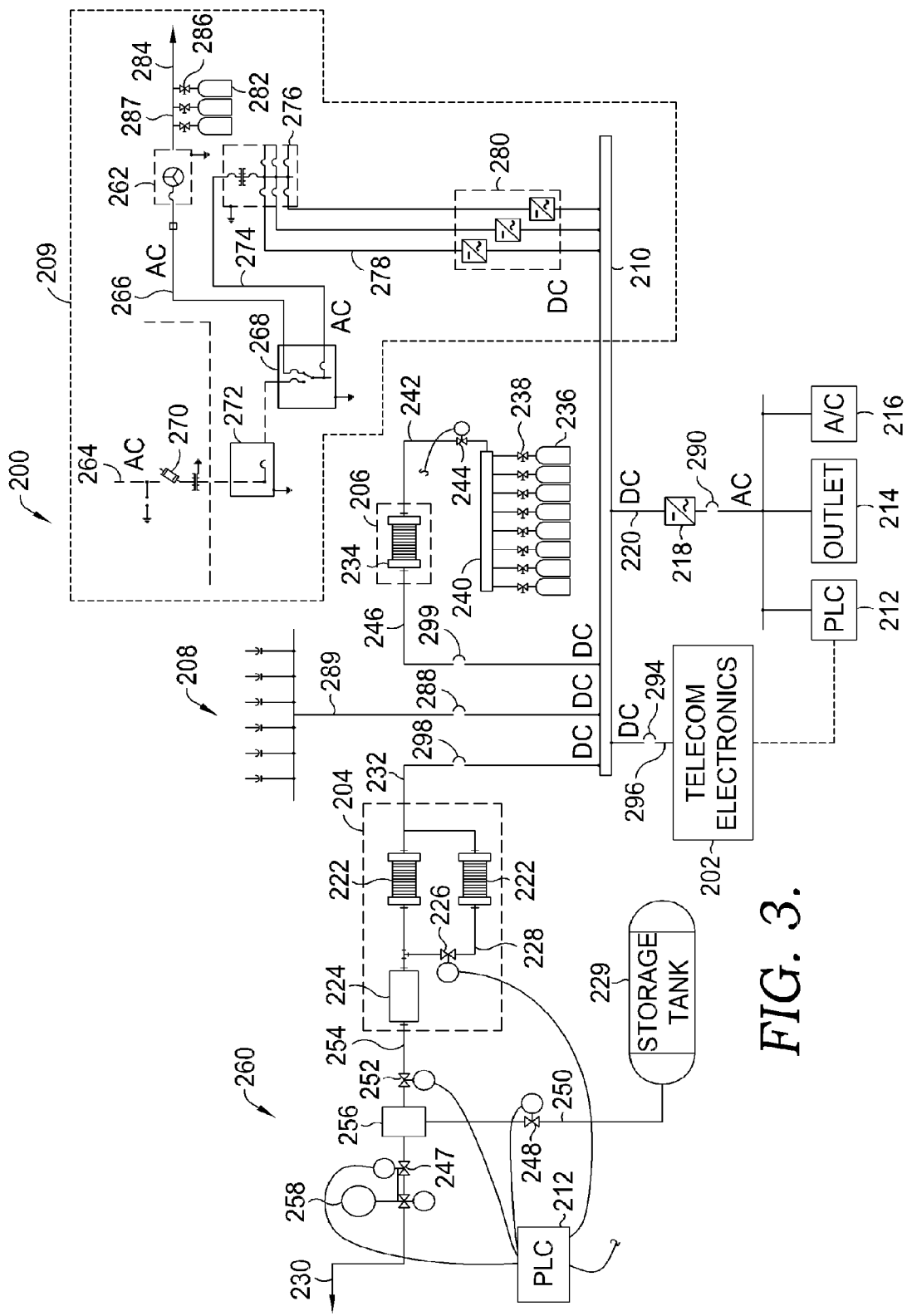
FIG. 3 is a schematic view of one embodiment of a second subsystem for providing DC electrical power at a telecommunications network site.

With reference to FIG. 3, a second subsystem 200 is illustrated for providing a power supply for telecommunications electronics 202 or other electronics present at a central facility 2000. The second subsystem 200 shares some common components with the first subsystem 100 as explained in more detail herein. Generally, the second subsystem includes various power generating/supplying components such as a primary power source component 204, a secondary power source component 206, a capacitive device 208, in much the same way as the first subsystem 100. These power generating/supplying components (and others described in detail herein) are coupled to a DC bus 210 to provide electrical power for power consuming/delivering components electrically connected with the bus 210. For instance, electrical current is drawn from the DC bus 210 by the telecommunications electronics 202, as well as a PLC 212, power outlet 214 and air conditioning unit 216 receiving AC power from an inverter 218 (54 VDC input/ 240 VAC output, in one configuration) located in-line on a conductive line 220 coupled directly with the DC bus 210.

The primary fuel cell based power source component 204 of the second subsystem 200 includes one or more PEMs 222 acting as fuel cells and a corresponding hydrogen reformer 224. In the particular embodiment illustrated in FIG. 3, a pair of PEMs 222 are depicted in series with an in-line automated pressure-controlled valve 226 positioned in a fuel line 228 between the reformer 224 and one of the PEMs 222. The in-line valve 226, in this configuration, controls whether hydrogen gas is supplied to one or both of the PEMs 222 depending on the desired amount of electrical power to be generated and supplied to the DC bus 210 and to account for fluctuations in the electrical output of any one of the PEMs 222. A hydrocarbon-based fuel, such as natural gas or propane, is supplied to the reformer 224 via one or more fuel storage tanks 229 or through a commercial utility pipeline 230. Ideally, the primary component 204 receives fuel from the pipeline 230 during normal operation. However, when this source is not available, the fuel storage tank 229 provides adequate fuel for operation of the reformer 224 and the PEMs 222 for a desired period of time. The PEMs 222 each produce a 54 VDC output carried by conductive line 232 to the DC bus 210.

The secondary fuel cell based power source component 206 includes one or more PEMs 234 receiving hydrogen fuel directly from a set of liquid hydrogen storage tanks 236. Automated pressure-controlled valves 238 are connected with the set of tanks 236, as well as a common manifold 240 and a downstream fuel line 242 containing an in-line automated pressure-controlled valve 244. As with the primary component 204, the PEM 234 produces a 54 VDC output carried by conductive line 246 to the DC bus 210.

The PLC 212 controls the operation of a plurality of automated pressure controlled valves of the second subsystem 200. This includes the in-line automated pressure-controlled valves 226 and 244 of the first component 204 and the second component 206, respectively, valves that control the flow of fuel from the storage tanks 229 and the pipeline 230 to the reformer 224, as well as other valves described in further detail herein. By controlling the fuel flow through the respective valves, the PLC 212 controls the sequence of operation of various power generating/supplying components of the second subsystem 200, including the switching from one power generating component to another component (or between alternate fuel supplies of one particular component) when the fuel supply is not adequate to maintain normal operating conditions for the component in question.

The valve arrangement upstream of the reformer 224 of the primary component 204 includes a primary automated pressure-controlled valve 247 regulating the fuel flow through the pipeline 230 moving towards the reformer 224, a secondary in-line automated pressure-controlled valve 248 regulating the flow of fuel through a fuel line 250 receiving the stored fuel from the fuel storage tank 229, and a third in-line automated pressure-controlled valve 252 downstream of the primary and secondary valves 247 and 248 regulating the flow through the main supply fuel line 254 for the reformer 224. Interposed between all three valves (247, 248, and 252) at a T-junction between pipeline 230, fuel line 250 and fuel line 254 is a surge tank 256 for absorbing pressure irregularities and thus minimizing any disruptive effects created by the opening and closing of the valves 247, 248 and 252. Additionally, upstream of the primary valve 246, a utility meter and manual shut-off valve 258 integrated into the pipeline 230 allows for ceasing of the flow of fuel from the pipeline 230 to the primary component 204 without the need for the PLC 212 to control fuel flow from the pipeline 230 (i.e., without having to shutoff primary valve 247). The combination of the valves 247, 248 and 252 surrounding the surge tank 256, and the tank 256 itself, is referred to herein as a fuel supply regulating mechanism 260.

The second subsystem 200 also includes power generating/supplying components in the form of a microturbine 262 as well as an incoming utility power line 264. The electrical power output of the microturbine 262 is fed via a conductive line 266 to a high voltage transfer switch 268. The incoming utility power line 264 feeds electrical power past a fuse cut-out transformer 270 (e.g., for ensuring that utility power surges are not transmitted to the circuits of the second subsystem 200) to a main service entrance breaker 272 and onto the transfer switch 268. For instance, the incoming utility power may be three phase, 277/480 VAC power, while the power generated by the microturbine 262 may be three phase, 480 VAC power, as examples. The transfer switch 268 determines whether the DC bus 210 receives utility supplied power or alternatively power generated by the microturbine 262. The sequences of activity that are affected by the transfer switch 268, and involve carrying out the modes of operation of the second subsystem 200, are explained in more detail herein. Another conductive line 274 extends from the transfer switch 268 for carrying the supplied AC power from the switch 268 to a 480/280 VAC transformer panel board 276. In one arrangement, the transformer panel board 276 provides contact connections for three conductive lines 278 to connect therewith. The conductive lines 278 each carry a portion of the electrical current fed into the transformer panel board 276 from the conductive line 274. Located in-line on the conductive lines 278 is a rectifier 280 for converting the alternating current received from the transformer panel board 276 to direct current for supply to the DC bus 210.

The fuel supply for the microturbine 262 is a hydrocarbon-based fuel, such as natural gas or propane, provided via a set of high pressure storage tanks 282 or via a commercial utility pipeline 284. Valves 286 controlling the flow of fuel from the storage tanks 282 may be manually operated shut-off valves or automated pressure-controlled valves. The output of the valves 286 and the pipeline 284 both lead to a main supply fuel line 287 directly connected with the microturbine 262. The operation of these valves 284 may be controlled by the PLC 212. Alternatively, the fuel supply regulating mechanism 260 integrated upstream of the primary component 204 of the second subsystem 200 may be implemented with the fuel supply arrangement upstream of the microturbine 262.

In a similar fashion to the first subsystem 100, various modes of operation for the second subsystem 200 (under PLC 212 or other device control) may be selected depending on the power consumption needs of the telecommunications electronics 202, as well as the PLC 212 itself and any other consumption devices electrically coupled with the DC bus 210. It is contemplated that each power generating/supplying component may operate alone in supplying power to the DC bus 210 or in tandem with other components. For instance, under one set of rules, only a single power generating/supplying component is electrically connected with and supplying power to the DC bus 210 at any given point in time, as regulated by the breakers and/or switches present in the various conductive lines of the second subsystem 200. Alternatively, under another set of rules, some temporal overlap is allowed whereby an additional power generating/supplying component becomes electrically connected with the DC bus 210 during a startup phase of power generation for that additional component, ensuring that adequate electrical current is supplied to the DC bus 210. Under yet another set of rules, multiple power generating/supplying components electrically may be connected with and supplying power to the DC bus 210 at the same time, if a heavy load demand is placed on the DC bus 210 by the power consuming components of the second subsystem 200. The breakers are also arranged in second subsystem 200 in much the same way as in the first subsystem 100. More specifically, the second subsystem 200 includes breaker 288 present in a conductive line 289 leading to the capacitive device 208 (e.g., a plurality of capacitors), breaker 290 present in conductive line 220 between the inverter 218 and the power consuming/delivering components (e.g., PLC 212, power outlet 214, air conditioning unit 216), breaker 294 present in conductive line 296 leading to the telecommunications electronics 202, breaker 298 present in conductive line 232 extending from the PEM 222 output of the primary component 204, as well as breaker 299 present in conductive line 246 extending from the PEM 234 output of the secondary component.

In one exemplary operational scheme for providing uninterrupted power to the DC bus 210, utility power supplied by the utility power line 264 is used during normal operation, followed by power supplied by the microturbine 262 when the utility power is not available, followed by power supplied by the PEMs 222 of the primary component 204 when the microturbine 262 is not available, followed by bridging power provided by the capacitive device 208 when the primary component 204 is not providing adequate power, and subsequently followed by power supplied by the PEM 234 of the secondary component 206. The appropriate breakers 288, 298 and 299 are closed when the respective power generating/supplying components (capacitive device 208, primary component 204 and secondary component 206) are providing electrical power to the DC bus 210, and are opened otherwise, in the manner as explained above for the modes of operation of the first subsystem 100. In a similar fashion, the transfer switch 268 is positioned to complete a circuit with the utility power line 264 when power is supplied by the utility, and alternately to complete a circuit with the conductive line 266 when the microturbine 262 when the same is operational and supplying power. When neither the utility power line 264 nor the microturbine 262 is supplying power, the transfer switch 268 may be moved to close the circuit with the power line 264 while the service entrance breaker 272 is moved from the closed to the open position. This ensures that significant electrical current is not drained from the DC bus 210 by flowing back up the electrical lines 278 and 274 to either the microturbine 263 or the power line 264. With respect to the fuel supply to the primary component 204, the secondary component 206, and the microturbine 262, the valving structure of the second subsystem 200 is controlled by the PLC 212 in such a way that utility supplied fuel (i.e., through pipelines 230 and 284) is first used by the respective power generating components, followed by the stored fuel from the storage tanks 229 and 282. Accordingly, in the case of the fuel supply regulating mechanism 260 for the primary component 204, valves 247 and 252 are opened, while valve 248 is closed, during typical power generation activity where utility supplied fuel is consumed. When the pipeline 230 cannot supply adequate fuel, valve 248 is opened, followed immediately by valve 248 being closed and valve 248 to continue uninterrupted flow of fuel to the reformer 224. The surge tank 256 works to maintain an even pressure through the main supply fuel line 254, especially during transitions between the utility fuel supply from the pipeline 230 and the stored fuel supply from the storage tank 229. Likewise, when the utility supplied fuel through pipeline 284 is not available for the microturbine 262, the valves 286 for the storage tanks 282 move to the open position to enable the tanks 282 to supply fuel for operation of the microturbine. It should also be understood that the fuel supply regulating mechanism 260 may be integrated into the main supply fuel line 287, as an alternative to the storage tank valves 286, to control the delivery of fuel to the microturbine 262 according to the desired operational scheme for the second subsystem 200.

Figure 4:
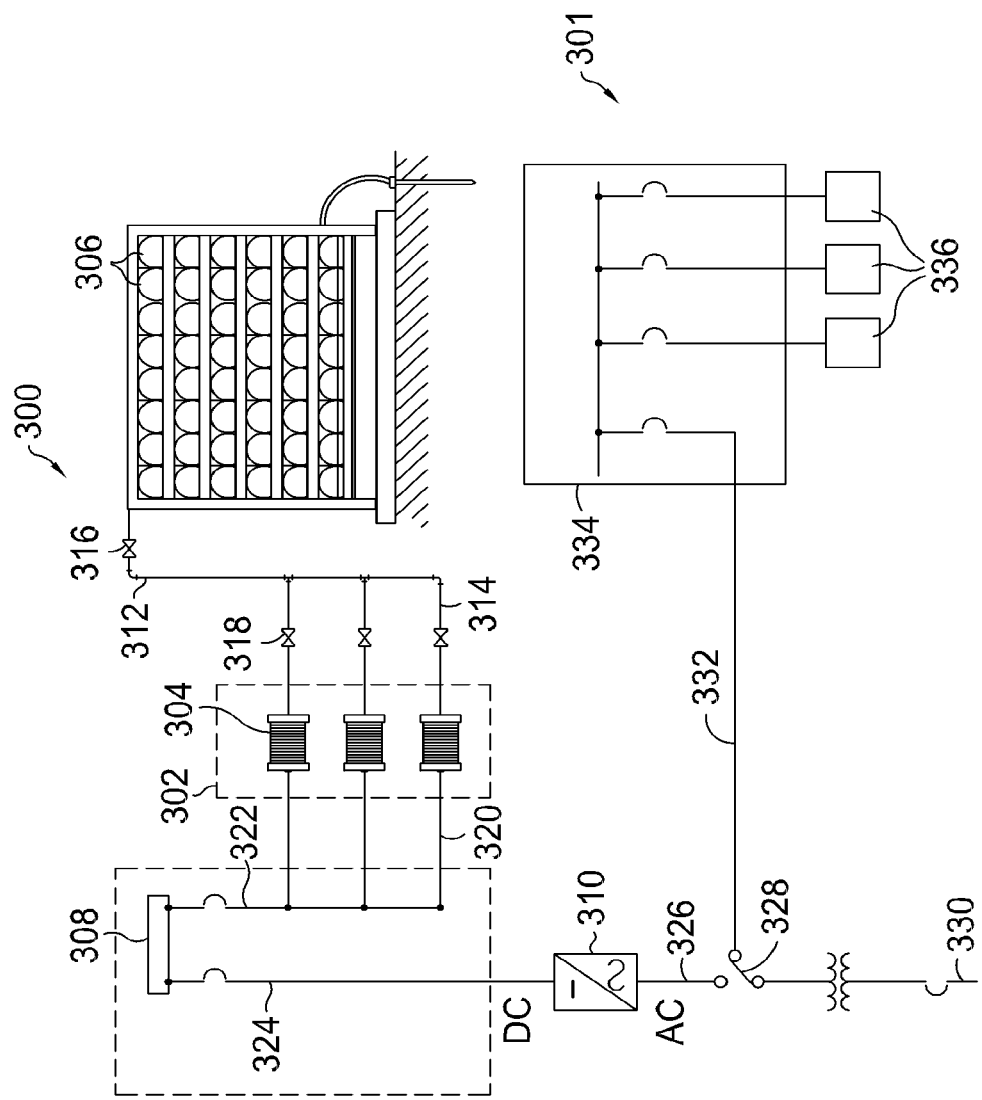
FIG. 4 is a schematic view of one embodiment of a circuit for providing DC electrical power for operating climate control units at a telecommunications network site.

A dedicated back-up power generation system 300, for providing AC electrical power to a cooling system 301 for the facility where the second subsystem 200 is located, is illustrated in FIG. 4. The power generation system 300 includes a power source component 302 including one or more PEMs 304 acting as fuel cells, for generating DC electrical power. Additionally, within the power generation system 300 is a set of hydrogen fuel storage tanks 306 supplying fuel to the PEMs 304, a DC bus 308 for receiving the electrical current output from the PEMs 304, as well as an inverter 310 electrically coupled with the DC bus 308 to convert the input DC electrical power from the DC bus 308 to output AC electrical power for consumption by the cooling system 301. A fuel line 312 extends from a header (not shown) connected with the storage tanks 306 to a set of branch fuel lines 314 each connected with the input of one of the PEMs 304. A primary in-line valve 316 is located in the fuel line 312 and a secondary in-line valve 318 is located in each of the branch fuel lines 314. This arrangement controls overall power generation by the power source component 302 as well as the simultaneous operation of selective PEMs 304, thereby controlling how much DC electrical power is generated. Each PEM 304 outputs DC electrical power to one branch conductive line 320 each electrically coupling with an input feeder conductive line 322 coupled directly with the DC bus 308. An output feeder conductive line 324 coupled directly with the DC bus 308 carries the electrical current to the inverter 310. The output electrical line 326 from the inverter 310 carries AC to a transfer switch 328, for alternating between AC supplied via a utility power line 330, and when the commercial utility is not adequate, the AC supplied by the power source component 302 through the inverter 310. The downstream conductive line 332 extending from the transfer switch 328 carries the AC to the cooling system 301. Specifically, the cooling system 301 includes a panelboard 334 which divides the AC for use by individual air conditioning units 336 electrically coupled with the panelboard 334.

Figure 5:
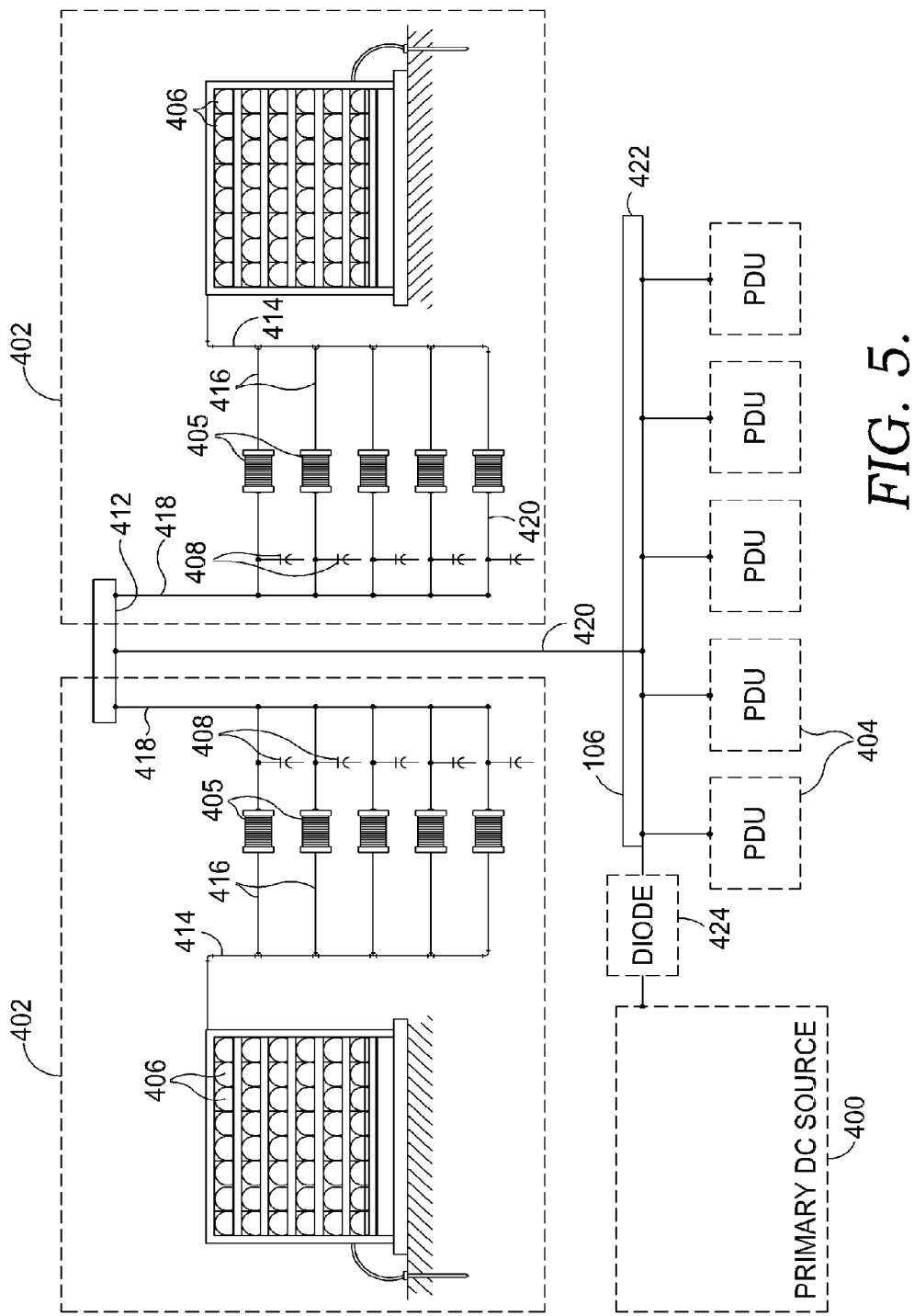
FIG. 5 is a schematic view of one embodiment of a third subsystem for providing DC electrical power at a telecommunications network site.

Turning to the power supply arrangement for the mega site 3000, as shown in FIG. 5, a primary DC electric power supply source 400 and a set of backup DC electrical power generation units 402 function together to provide uninterrupted power to a plurality of power distribution units (PDU) 404 of the mega site 3000. The power supply arrangement depicted in FIG. 5 may also be referred to herein as a third subsystem. The PDUs 404 supply power to telecommunications equipment (e.g., routers, switches, servers) at the mega site 3000. In one exemplary configuration, each PDU 404 requires 400 A, 48 VDC, with five PDUs 404 demanding from a DC supply bus 422 an electrical power requirement of 2000 A, 48 VDC (100 KW).

The power generation units 402 each include one or more PEMs 405 acting as fuel cells, for generating DC electrical power, a set of hydrogen fuel storage tanks 406 supplying fuel to the PEMs 405, a capacitor 408 electrically coupled with a branch conductive line 410 extending from the output of each PEM 405, as well as a DC bus 412 with which each power generation unit 402 is electrically coupled. A fuel line 414 extends from a header (not shown) connected with the storage tanks 406 to a set of branch fuel lines 416 each connected with the input of one of the PEMs 405. Each branch conductive line 410 electrically couples with an input feeder conductive line 418 coupled directly with DC bus 412. An output feeder conductive line 420 coupled directly with the DC bus 412 carries the electrical current to the DC supply bus 422 with which the PDUs 404 are directly connected. The DC electrical power supply source 400 is electrically coupled with the DC supply bus 422 via a conductive line 423. Positioned on the conductive line 423 between the primary DC electrical power supply source 400 and the DC supply bus 422 is a back-feed diode 424. The back feed-diode 424 enables current to flow only in the direction leading from the primary DC source 400 to the bus 422, and not in reverse. This prevents electrical current to be drained from the DC supply bus 422 by the primary DC source 400 when the source 400 is not providing electrical power and operation of the backup DC electrical power generation units 402 is underway.

In operation, the primary DC electric power supply source 400 supplies the DC electrical power to the DC supply bus 422 and thus to the PDUs 404 during normal operating conditions. When the PDUs 404 are not receiving adequate power from the primary DC source 400, or otherwise a shutdown condition of the primary DC source 400 is noted, the hydrogen storage tanks 406 are opened to each fuel line 414 and fuel begins flowing to the PEMs 405 of each power generation unit 402 (or only one unit 402 if DC power generation from that unit is adequate). DC electrical power is then generated by the PEMs 405, which flows to the DC bus 412 and onto the DC supply bus 422 for consumption by the PDUs 404. During the start-up phase for the PEMs 405 (generally a few seconds), the capacitors 408, having been previously charged by the primary DC source 400 during normal operating conditions, provide a DC discharge to the DC bus 412 to ensure that the PDUs 404 receive adequate electrical power until the PEMs 405 can provide full electrical power.

Figure 6:
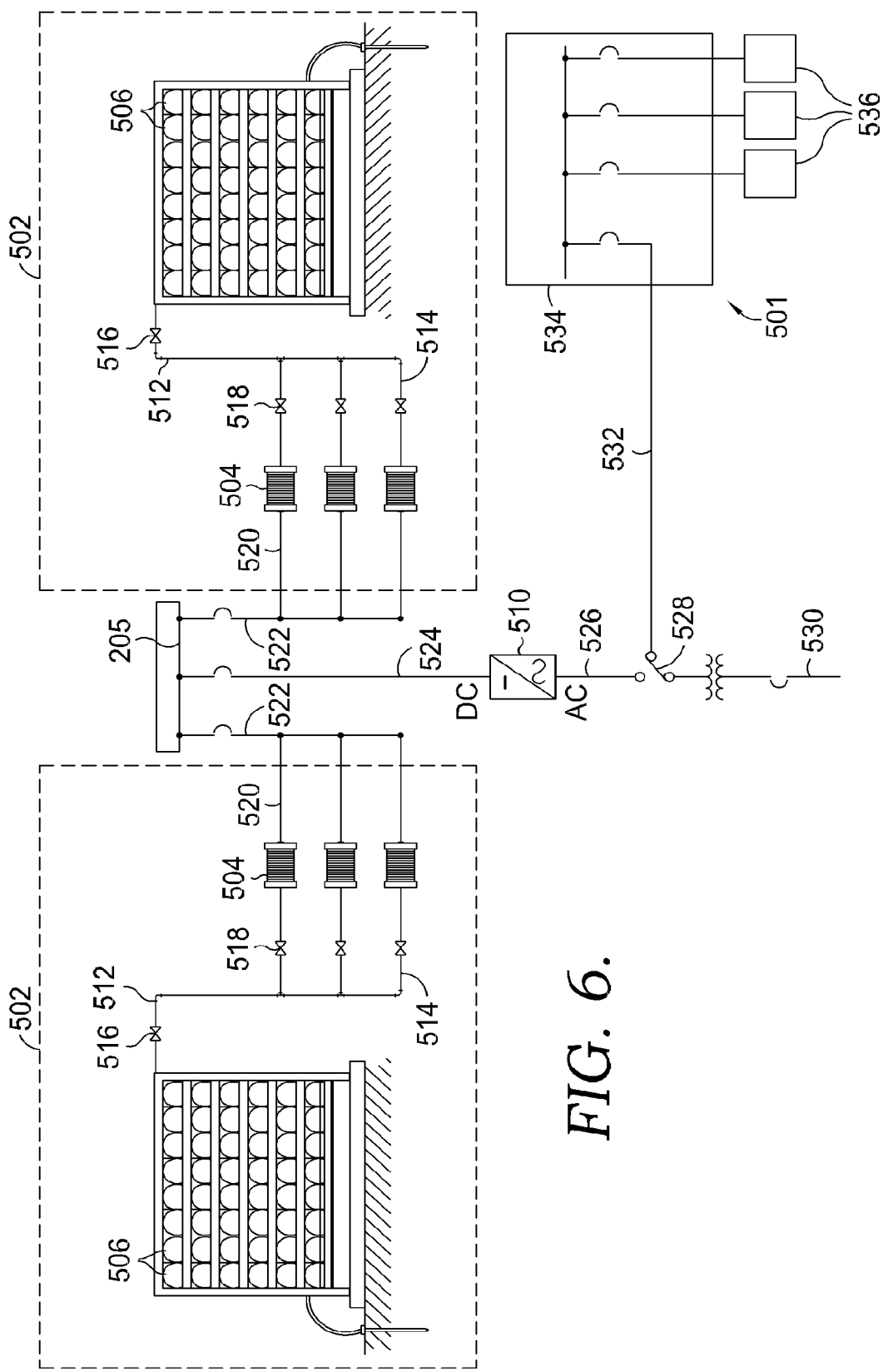
FIG. 6 is a schematic view of another embodiment of a circuit for providing DC electrical power for operating climate control units at a telecommunications network site.

Turning to FIG. 6, a dedicated back-up power generation system 500 is illustrated for use at the mega site 3000 facility. In particular, the power generation system 500 functions to provide AC electrical power to a cooling system 501 for the facility mega site 3000 facility. The power generation system 500 is similar to the power generation system 300 of FIG. 4, expect that system 500 has another independent set of PEMs and fuel storage tanks coupled with an DC bus. The power generation system 500 includes separate power generation units 502 for generating DC electrical power. Each unit 502 is formed by one or more PEMs 504 acting as fuel cells, as well as a set of hydrogen fuel storage tanks 506 supplying fuel to the PEMs 504. A DC bus 508 receives the electrical current output from the PEMs 504 and an inverter 510 is electrically coupled with the DC bus 508 to convert the input DC electrical power from the DC bus 508 to output AC electrical power for consumption by the cooling system 501. Within each power generation unit 502, a fuel line 512 extends from a header (not shown) connected with the storage tanks 506 to a set of branch fuel lines 514 each connected with the input of one of the PEMs 504. A primary in-line valve 516 is located in the fuel line 512 and a secondary in-line valve 518 is located in each of the branch fuel lines 514. This arrangement controls overall power generation by the respective PEMs 504 as well as the simultaneous operation of selective PEMs 504, thereby controlling how much DC electrical power is generated by the particular power generation unit 502. Each PEM 504 outputs DC electrical power to one branch conductive line 520 each electrically coupling with an input feeder conductive line 522 coupled directly with the DC bus 508. An output feeder conductive line 524 coupled directly with the DC bus 508 carries the electrical current to the inverter 510. The output electrical line 526 from the inverter 510 carries AC to a transfer switch 528, for alternating between AC supplied via a utility power line 530, and when the commercial utility is not adequate, the AC supplied by the power generation units 502 through the inverter 510. The downstream conductive line 532 extending from the transfer switch 528 carries the AC to the cooling system 501. Specifically, the cooling system 501 includes a panelboard 534 which divides the AC for use by individual air conditioning units 536 electrically coupled with the panelboard 534, in the same arrangement provided by the power generation system 300 of FIG. 4.

As can be understood, the present invention provides an end-to-end power supply solution for a telecommunications network, and portions of such a network. The Furthermore, it should be appreciated by people skilled in the art that the present invention is not limited to what has been particularly shown and described above. Rather, all matter shown in the accompanying drawings or described above is to be interpreted as illustrative and not limiting. Accordingly, the scope of the present invention is defined by the appended claims rather than the foregoing description.

What is claimed is:

1. A power system for a telecommunications network, comprising:
    a first subsystem for providing DC electrical power to a first telecommunications network location, the first subsystem comprising a valving structure controlled by a programmable logic controller (PLC) that switches between a utility supplied fuel source and one or more stored fuel supply sources, wherein the first subsystem further comprises at least a first power source component and a second power source component, wherein the first power source component comprises: at least a first proton exchange membrane adapted to directly receive hydrogen fuel from the utility supplied fuel source or a first stored hydrogen fuel source, wherein the first power source component is operable to produce DC electrical power during a normal operating mode, and wherein the second power source component comprises at least a second proton exchange membrane adapted to directly receive hydrogen fuel from a second stored hydrogen fuel source coupled with a reformer, wherein the first stored hydrogen fuel source is separate from the second stored hydrogen fuel source, the second power source component operable to produce DC electrical power during a backup mode, an energy storage device, and a DC bus for interconnecting at least the first power source component the second power source component, and the energy storage device, in parallel, wherein the energy storage device is configured to operate during:
    (1) at least a startup phase of power generation of the second power source component, or
    (2) upon a low pressure condition being sensed in an in-line valve with a fuel line of the second power source component, wherein the switching between the second power source component and the energy storage device when the low pressure condition is detected for the second power source component is managed by the PLC, wherein the low pressure condition is indicative of an insufficient fuel flow from the reformer coupled to the second stored hydrogen fuel source of the second power source component; and
    a second subsystem for providing DC electrical power to a second telecommunications network location, the second subsystem including at least one microturbine generator operable to produce AC electrical power, at least one rectifier operable to convert the AC electrical power from the at least one microturbine generator to DC electrical power, and at least one power source comprising at least one proton exchange membrane operable to produce DC electrical power.

2. The system of claim 1, wherein the first telecommunications network location comprises a wireless communication site utilizing a base transceiver system.

3. The system of claim 1, wherein the second telecommunications network location comprises a telecommunications exchange or a point of presence server.

4. The system of claim 1, further comprising a third subsystem for providing DC electrical power to a multiple systems operator, the third subsystem including at least one power source comprising at least one proton exchange membrane operable to produce DC electrical power and an inverter for converting incoming DC electrical power to AC electrical power.

5. The system of claim 4, wherein the at least one power source of the third subsystem comprises a first series of proton exchange membranes on a first circuit and a second series of proton exchange membranes on a second circuit, the third subsystem further including at least one power distribution unit connected with the first circuit and wherein the inverter is connected with the second circuit.

6. The system of claim 1, wherein the second subsystem further includes an energy storage device for storing the DC electrical power.

7. The system of claim 6, wherein the energy storage device of the second subsystem comprises one or more capacitors.

8. The system of claim 1, wherein the second subsystem further includes an inverter for converting incoming DC electrical power to AC electrical power.

9. The system of claim 1, wherein the energy storage device of the first subsystem comprises one or more capacitors.

10. The system of claim 1, wherein the at least one proton exchange membrane of the at least one power source of the second subsystem comprises: one or more proton exchange membranes on a first circuit as well as one or more proton exchange membranes on a second circuit, the at least one microturbine generator and the at least one rectifier being connected to the first circuit, the second subsystem further including an inverter for converting incoming DC electrical power to AC electrical power and connected with at least the second circuit.

* * * * *